T. A. WILLARD.
STORAGE BATTERY.
APPLICATION FILED JULY 6, 1915.
1,279,953.
Patented Sept. 24, 1918.
2 SHEETS—SHEET 1.
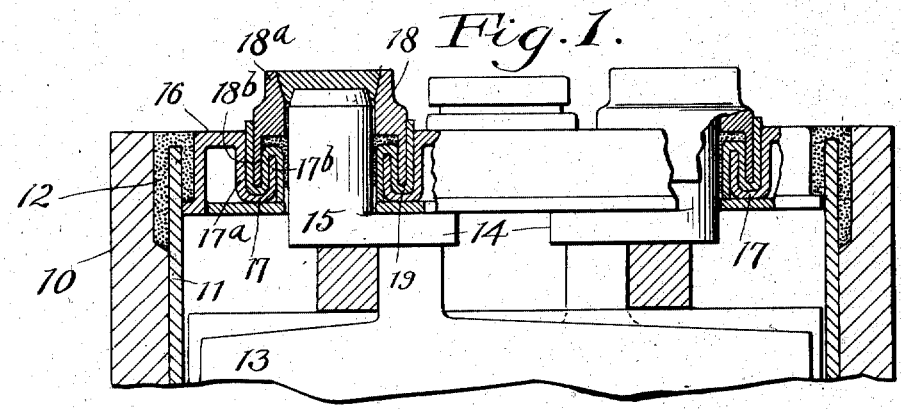
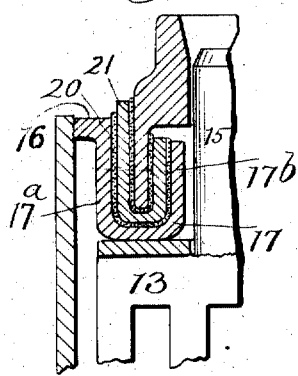
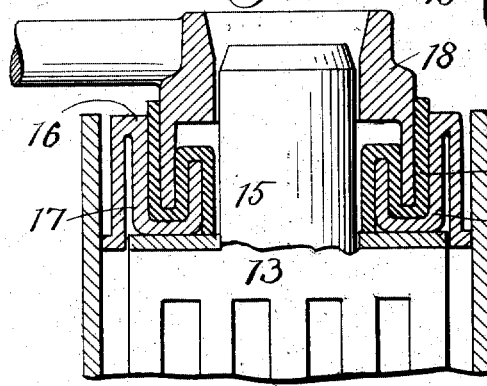
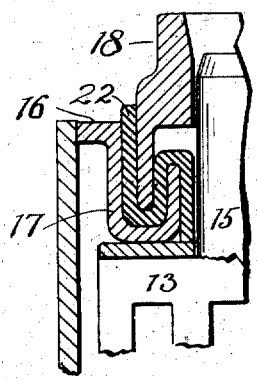
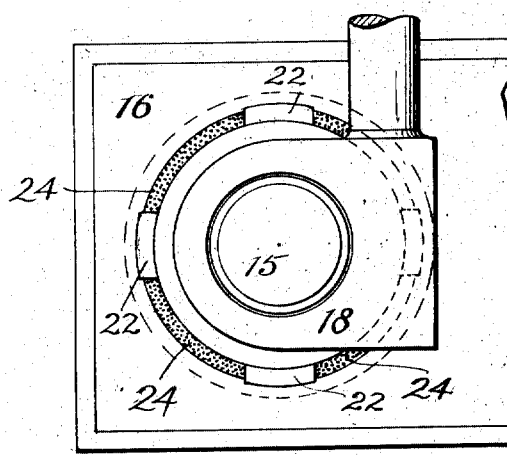
Inventor
Theodore A. Willard
by Thurston & Kwis
Attys

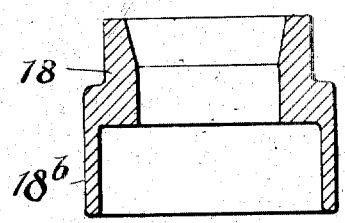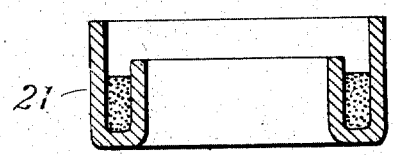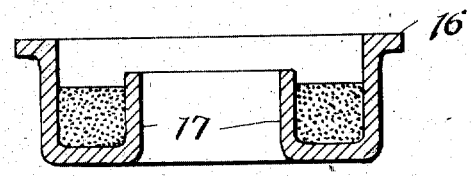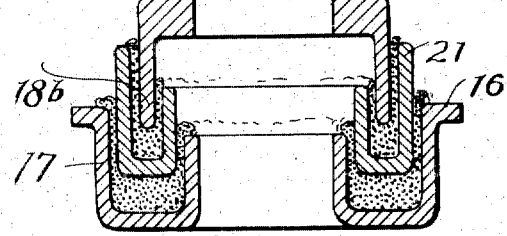

UNITED STATES PATENT OFFICE.

THEODORE A. WILLARD, OF CLEVELAND, OHIO, ASSIGNOR TO WILLARD STORAGE BATTERY COMPANY, OF CLEVELAND, OHIO, A CORPORATION OF WEST VIRGINIA.

STORAGE BATTERY 1,279,953.　　　　Specification of Letters Patent.　　Patented Sept. 24, 1918.

Application filed July 6, 1915. Serial No. 38,169.

*To all whom it may concern:*

Be it known that I, THEODORE A. WILLARD, a citizen of the United States, residing at Cleveland, in the county of Cuyahoga and State of Ohio, have invented a certain new and useful Improvement in Storage Batteries, of which the following is a full, clear, and exact description.

This invention relates to storage batteries, and especially to means for sealing the terminal posts in the battery jar cover for the prevention of creepage of acid or battery solution around the posts to the exterior of the cover.

The present application is a continuation in part of my prior Patent, No. 1,150,917, August 24, 1915, wherein the post is sealed in the cover by providing in or on the cover a receptacle preferably in the form of a groove or depression adapted to contain sealing compound and by providing on the post a connector having a portion preferably in the form of a flange or petticoat which surrounds the post and extends down into the sealing compound.

The present invention is preferably utilized in connection with metal battery covers, and has for its object to provide a construction wherein the post is both sealed in the cover and effectively insulated therefrom.

The invention may be briefly summarized as consisting in certain novel details of construction and combinations and arrangements of parts which will be described in the specification and set forth in the appended claims.

In the accompanying sheets of drawings, Figure 1 is a longitudinal sectional view through the upper part of a battery embodying my invention; Fig. 2 is a perspective view of an insulating cup or sleeve employed in the construction shown in Fig. 1; Fig. 3 is a transverse sectional view through the battery; Fig. 4 is a fragmentary sectional view showing a modification; Fig. 5 is a plan view of a portion of a battery showing a further modification; Fig. 6 is a fragmentary sectional view of the same construction; Fig. 7 is a perspective view of an insulating spacer employed in the construction or modification shown in Figs. 5 and 6; Fig. 8 is a sectional view through the cover, insulating cup and connector with the parts isolated and ready to be assembled, and showing a further slight modification in the method of simultaneously sealing and insulating; and Fig. 9 is a similar view of the same partly assembled.

In the drawings, 10 represents a storage battery box which receives a number of jars 11, one of which is shown, and each of which is sealed in the box by sealing material, such as shown at 12. The jar contains the usual positive and negative battery plates 13 which are connected together in the customary manner by straps 14 from which extend upwardly the positive and negative terminal posts 15. The jar is provided with a cover 16, which, with the present invention, is preferably composed of metal.

The cover 16 is provided with openings through which the terminal posts 15 extend and with receptacles 17 which surround the openings. These receptacles may be formed in different ways, as is obvious, but preferably they are formed as in my prior application previously referred to, and hence are in the shape of grooves or depressions which project beneath the top of the cover, and each is formed by an outer downturned flange 17$^a$ of the cover and an inner upturned flange 17$^b$ which surrounds the terminal post 15 and is spaced therefrom.

Fitted onto the top of each terminal post 15 and secured thereto preferably by lead burning is a connector 18, which may be either a cell connector adapted to connect together the positive and negative posts of adjacent jars or a terminal connector to which one end of a flexible conductor may be secured. This connector 18 is provided with a body portion 18$^a$ having a socket which receives the end of the post and with a depending portion preferably in the form of a flange or petticoat 18$^b$ which extends down into the receptacle or depression 17. In my prior application the flange extends down into a sealing compound provided in the receptacle, and thus forms a very effective seal for the post.

In the present construction the flange is not only sealed in the receptacle, but is insulated therefrom in such a way as to prevent contact between the connector and the cover 16, as might be the case if the connector is not centrally located with reference to the walls of the receptacle.

The connector may be insulated and sealed in numerous ways, but in the preferred construction I employ an insulating sleeve or cup 19, which is provided with reversely extending flanges or walls forming an upwardly facing groove or depression which receives the flange or petticoat 18[b] of the connector, and a downwardly facing groove or recess which receives the inner upturned flange 17[b] of the cover. The parts are so proportioned that the rubber sleeve fits tightly both the cover and connector.

The interfitting parts of the insulating sleeve and the walls or flanges of the cover and connector may be sealed in various ways, such as by coating the flange portions of the sleeve with sealing compound which after the parts are assembled will harden and will effectively prevent creepage of battery or acid solution to the exterior of the cover. This is illustrated in Fig. 4, wherein the coating of sealing compound is shown at 20 in exaggerated thickness. In this figure the construction or shape of the insulating sleeve is slightly modified as it differs from the form shown in Figs. 1 and 2 in the respect that the inner downturned flange which in the prior construction extends between the post and the inner flange 17[b] of the cover is omitted.

Another method of sealing the insulating sleeve to the parts of the connector and cover which the sleeve engages consists in forming the sleeve of sticky unvulcanized rubber and in vulcanizing or curing the rubber after the parts are assembled.

A still further method is illustrated in Figs. 8 and 9. As there shown, before the insulating sleeve is fitted down into the groove or depression of the cover and before the connector is fitted into the insulating sleeve (which is of the same construction as illustrated in Fig. 4) the groove or recess 17 of the cover and the groove or recess of the insulating sleeve are partially filled with melted or liquid sealing compound or cement. Then when the parts are assembled or forced together in the manner illustrated in Fig. 9 a part of the sealing compound will be squeezed out of the grooves and up between the interfitting parts, enough remaining between these parts to effectively seal and cement them together.

It is not essential that the insulating medium for each post be of one integral part, but it may be formed of several separate pieces, such as illustrated at 22 in Figs. 5, 6 and 7. As here shown I employ four pieces of rubber, each substantially S-shaped. These insulating spacing members which are arranged 90° apart space the post from the inner flange of the cover and space the flange or petticoat of the connector from both the inner and outer flanges of the cover as shown in Fig. 6. The spaces between the separators or spacers 22 is filled with sealing compound 24, which will be placed in the groove or depression either before or after the spacers are placed in position so that when the connector is fitted onto the post the flange extending down into the groove or depression of the cover the parts will be effectively sealed.

I have here illustrated terminal posts circular in cross section and the other parts which coöperate with or surround the post of the same shape in cross section. However, this cross sectional shape of the parts is shown for convenience of illustration only, and I do not wish to be confined to the same, as they may assume any other shape desired, such as square or rectangular, it being understood that with the square or rectangular post the opening in the cover, and the flanges of the cover, connector and insulating sleeve 19, will be correspondingly shaped.

I do not desire to be confined to the exact details shown, but aim in my claims to cover all modifications which do not involve a departure from the spirit and scope of my invention.

Having described my invention, I claim:

1. In a storage battery, a jar or container having a cover provided with an opening for a terminal post and with a receptacle surrounding the post, a connector on the post having a portion extending downward into the receptacle and an insulating spacer separating the said portion of the connector from the wall or walls of the receptacle.

2. In a storage battery, a container having a cover provided with an opening for terminal post and with a walled receptacle surrounding the opening, a terminal post extending through the opening, a connector on the terminal post, said connector having a portion extending down into said receptacle, and rubber insulating means spacing said portion of the connector from the wall or walls of the receptacle.

3. A storage battery container having a cover provided with an opening for a terminal post, and with a walled receptacle surrounding the opening, a terminal post extending up through said opening, a connector on the post having a portion extending downward into the receptacle, and an insulating medium fitted into the receptacle and tightly engaging the said portion of the connector.

4. A storage battery container having a cover provided with an opening for a terminal post and with a walled receptacle surrounding the opening, a terminal post extending through said opening, a connector on the post having a portion extending downward into the receptacle, and an insulator in said receptacle spacing the said portion of the connector from the wall or walls of the receptacle and sealed to the connector and to the wall or walls of the receptacle.

5. In a storage battery, a container having a cover provided with an opening for a terminal post, a pair of inner and outer walls or flanges surrounding said opening and forming a receptacle, an insulator fitted into said receptacle and having an upwardly facing groove, and a connector on the post having a portion extending downwardly into said groove of the insulator.

6. In a storage battery, a container having a cover provided with an opening for a terminal post, a pair of inner and outer walls or flanges surrounding said opening and forming a receptacle, an insulator fitted into said receptacle and having an upwardly facing groove, and a connector on the post having a depending portion extending downwardly into said groove of the insulator, said insulator and depending portion of the connector being sealed in the receptacle.

7. In a storage battery, a container having a cover provided with an opening for a terminal post and with inner and outer walls or flanges surrounding said opening and forming a receptacle, a terminal post extending through said opening, an insulator fitted into the receptacle and provided with an upwardly facing groove and with a portion extending over the inner wall or flange of the cover, and a connector on the post having a depending portion extending into said receptacle between the walls thereof and fitted into the groove of said insulator.

8. In a storage battery, a container having a cover provided with an opening for a terminal post and with inner and outer walls or flanges surrounding said opening and forming a receptacle, a terminal post extending through said opening, an insulator fitted into the receptacle and provided with an upwardly facing groove and with a portion extending over the inner wall or flange of the cover, and a connector on the post having a depending portion extending into said receptacle between the walls thereof and fitted into the groove of the said insulator, said insulator and depending portion of the connector being sealed in the receptacle.

9. A storage battery container having a cover provided with an opening for a terminal post, inner and outer walls or flanges forming a groove or depression surrounding the opening, an insulating rubber sleeve fitted into said groove or depression and having an upwardly facing groove or depression in said receptacle and a portion extending over the inner wall or flange and along the inner surface thereof, a terminal post extending through said opening, and a connector on said post and provided with a depending portion extending downwardly into the receptacle and into said groove of the insulator, said insulator and said depending portion of the connector being sealed in said receptacle.

10. In a storage battery, a cover for a battery jar, a terminal post extending through the cover, a connector attached to the post, one of said parts having a depressed well or receptacle immediately surrounding the post and another a flange extending into the well, and an insulating spacer separating the flange from the wall or walls of the well.

11. In a storage battery a cover for a battery jar, a terminal post extending through the cover, a connector attached to the post, one of said parts having a depressed well or receptacle immediately surrounding the post and another having a flange extending into the well, and an insulating spacer fitted into the well and receiving the said flange.

In testimony whereof, I hereunto affix my signature.

THEODORE A. WILLARD.